US011816305B2

(12) United States Patent
Meng et al.

(10) Patent No.: US 11,816,305 B2
(45) Date of Patent: Nov. 14, 2023

(54) INTERFACE DISPLAY METHOD AND APPARATUS, AND STORAGE MEDIUM

(71) Applicant: TENCENT TECHNOLOGY (SHENZHEN) COMPANY LIMITED, Shenzhen (CN)

(72) Inventors: Jianqin Meng, Shenzhen (CN); Wei Zhuo, Shenzhen (CN); Hongfa Qiu, Shenzhen (CN); Yongjie Li, Shenzhen (CN)

(73) Assignee: Tencent Technology (Shenzhen) Company Limited, Guangdong (CN)

( * ) Notice: Subject to any disclaimer, the term of this patent is extended or adjusted under 35 U.S.C. 154(b) by 3 days.

(21) Appl. No.: 17/462,183

(22) Filed: Aug. 31, 2021

(65) Prior Publication Data
US 2021/0397309 A1 Dec. 23, 2021

Related U.S. Application Data

(63) Continuation of application No. PCT/CN2020/096293, filed on Jun. 16, 2020.

(30) Foreign Application Priority Data

Jul. 19, 2019 (CN) .......................... 201910656920.1

(51) Int. Cl.
*G06F 3/0482* (2013.01)
*G06F 3/04817* (2022.01)
(Continued)

(52) U.S. Cl.
CPC .......... *G06F 3/0482* (2013.01); *G06F 3/0486* (2013.01); *G06F 3/0488* (2013.01); *G06F 3/04817* (2013.01)

(58) Field of Classification Search
CPC .. G06F 3/0482; G06F 3/04817; G06F 3/0486; G06F 3/0488; G06F 3/0481;
(Continued)

(56) References Cited

U.S. PATENT DOCUMENTS

2011/0252375 A1* 10/2011 Chaudhri .............. G06F 3/0486
715/835
2014/0089833 A1* 3/2014 Hwang ............... G06F 3/04817
715/780
(Continued)

FOREIGN PATENT DOCUMENTS

CN 103067787 4/2013
CN 104598104 5/2015
(Continued)

OTHER PUBLICATIONS

English translation of International Search Report dated Sep. 17, 2020 in International Application No. PCT/CN2020/096293.
(Continued)

*Primary Examiner* — Jeanette J Parker
(74) *Attorney, Agent, or Firm* — Crowell & Moring, LLP

(57) ABSTRACT

Embodiments of this disclosure include an interface display method and apparatus. The method may include displaying a multi-task floating window in front of a user interface of the terminal and displaying a task floating window set in response to receiving a trigger signal corresponding to the multi-task floating window. The task floating window set may include at least one single-task floating window. One single-task floating window may be corresponding to one task. The method may further include receiving a selection instruction corresponding to a first single-task floating window in the task floating window set and displaying a user interface of a first task corresponding to the first single-task floating window.

16 Claims, 9 Drawing Sheets

(51) Int. Cl.
*G06F 3/0486* (2013.01)
*G06F 3/0488* (2022.01)

(58) Field of Classification Search
CPC .... G06F 3/0485; G06F 9/451; G06F 3/04883; G06F 3/048
See application file for complete search history.

(56) References Cited

U.S. PATENT DOCUMENTS

| | | | |
|---|---|---|---|
| 2014/0245203 A1* | 8/2014 | Lee | G06F 3/04845 |
| | | | 715/765 |
| 2016/0004388 A1* | 1/2016 | Lee | G06F 3/0482 |
| | | | 715/768 |
| 2016/0048412 A1* | 2/2016 | Liu | G06F 9/485 |
| | | | 718/107 |
| 2017/0249069 A1* | 8/2017 | Zamir | G09G 5/14 |
| 2018/0150208 A1 | 5/2018 | Song et al. | |
| 2018/0164959 A1* | 6/2018 | Gupta | G06F 3/04817 |
| 2019/0025988 A1* | 1/2019 | Liu | G06F 3/0481 |
| 2019/0065031 A1* | 2/2019 | Kang | G06F 3/0481 |
| 2020/0004387 A1* | 1/2020 | Kim | G06F 3/0481 |

FOREIGN PATENT DOCUMENTS

| | | |
|---|---|---|
| CN | 105700776 | 6/2016 |
| CN | 106909268 | 6/2017 |
| CN | 106980428 | 7/2017 |
| CN | 108021321 | 5/2018 |
| CN | 108776568 | 11/2018 |
| CN | 108897473 | 11/2018 |
| WO | WO 2019/119325 A1 | 6/2019 |

OTHER PUBLICATIONS

EPO Communication issued on European Application 208435867 dated Sep. 6, 2022, 9 pages.
Chinese Office Action dated Jul. 27, 2023 in corresponding Chinese Patent Application No. 201910656920.1.

* cited by examiner

INTERFACE DISPLAY METHOD AND APPARATUS, AND STORAGE MEDIUM

CROSS-REFERENCE TO RELATED APPLICATION

This application is a continuation application of PCT Patent Application No. PCT/CN2020/096293, filed on Jun. 16, 2020, which claims priority to Chinese Patent Application No. 201910656920.1, entitled "INTERFACE DISPLAY METHOD AND APPARATUS, TERMINAL, AND STORAGE MEDIUM" filed on Jul. 19, 2019, wherein the content of each of the above-referenced applications is incorporated herein by reference in its entirety.

FIELD OF THE TECHNOLOGY

Embodiments of this disclosure relate to the field of terminal technologies, and in particular, to an interface display method and apparatus, a terminal, and a storage medium.

BACKGROUND OF THE DISCLOSURE

An application program may provide different user interfaces (UI) for a user, to display different information or implement different functions.

A social application program is used as an example. The social application program usually integrates a plurality of functions such as instant messaging, information reading, online shopping, online payment, file browsing, note sharing, and applets. Therefore, when using the social application program, the user may view different information on different UIs, and interface switching is needed. When a first UI needs to be switched to a second UI, the user usually needs to return to a main interface from the first UI step by step, and then open the second UI from the main interface step by step. In this case, if the user intends to review information in the first UI, the user still needs to return to the main interface from the second UI step by step, and then open the first UI from the main interface step by step.

Therefore, the current application program has a long operation path for switching between the UIs, resulting in relatively low switching efficiency.

SUMMARY

Embodiments of this disclosure provide an interface display method and apparatus, a terminal, and a storage medium, to improve switching efficiency when switching is performed between a plurality of user interfaces (UI) of an application program. The technical solutions are as follows.

According to an aspect, an embodiment of this disclosure provides an interface display method applicable to a terminal. The method may include displaying a multi-task floating window in front of a user interface of the terminal and displaying a task floating window set in response to receiving a trigger signal corresponding to the multi-task floating window. The task floating window set may include at least one single-task floating window. One single-task floating window may be corresponding to one task. The method may further include receiving a selection instruction corresponding to a first single-task floating window in the task floating window set and displaying a user interface of a first task corresponding to the first single-task floating window.

According to another aspect, an embodiment of this disclosure provides an interface display apparatus. The apparatus may include a memory operable to store computer-readable instructions and a processor operable to read the computer-readable instructions. The processor when executing the computer-readable instructions is configured to display a multi-task floating window in front of a user interface of the terminal and display a task floating window set in response to receiving a trigger signal corresponding to the multi-task floating window. The task floating window set may include at least one single-task floating window. One single-task floating window may be corresponding to one task. The processor may be further configured to receive a selection instruction corresponding to a first single-task floating window in the task floating window set and display a user interface of a first task corresponding to the first single-task floating window.

According to still another aspect, an embodiment of this disclosure provides a terminal, including a processor and a memory, the memory storing at least one instruction, at least one program, a code set, or an instruction set, and the at least one instruction, the at least one program, the code set, or the instruction set being loaded and executed by the processor to implement the interface display method.

According to yet another aspect, an embodiment of this disclosure provides a non-transitory computer-readable storage medium having processor executable instructions stored thereon. The processor executable instructions may cause a processor to display a multi-task floating window in front of a user interface of the terminal and display a task floating window set in response to receiving a trigger signal corresponding to the multi-task floating window. The task floating window set may include at least one single-task floating window. One single-task floating window may be corresponding to one task. The instructions may cause the processor to receive a selection instruction corresponding to a first single-task floating window in the task floating window set and display a user interface of a first task corresponding to the first single-task floating window.

According to yet another aspect, an embodiment of this disclosure provides a computer program product, when executed, the computer program product being used for performing the interface display method in the foregoing aspect.

The technical solutions provided in the embodiments of this disclosure may bring the following beneficial effects:

A multi-task floating window is displayed in front of a UI, after a trigger signal corresponding to the multi-task floating window is obtained, a task floating window set is displayed, and any single-task floating window in the task floating window set may be selected to open a UI of a task corresponding to the single-task floating window. Because the multi-task floating window supports display of a plurality of single-task floating windows, a user may create corresponding single-task floating windows for UIs of a plurality of different tasks. In this way, when switching is performed between the UIs of the plurality of tasks, the different tasks can be selected through the multi-task floating window, thereby achieving quick switching between the plurality of tasks, and adequately improving efficiency of switching between the plurality of tasks.

DESCRIPTION OF EMBODIMENTS

Implementations of this disclosure are further described in detail below with reference to the accompanying drawings.

Figure 1:
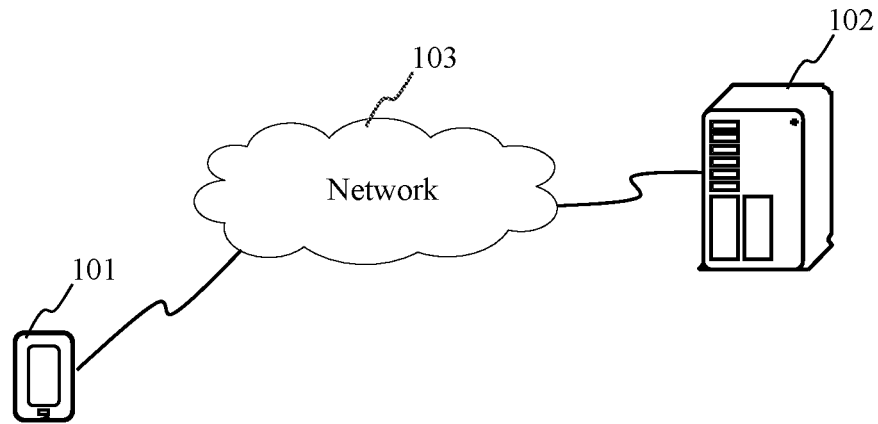
FIG. 1 is a schematic diagram of an implementation environment according to an embodiment of this disclosure.

FIG. 1 is a schematic diagram of an implementation environment according to an embodiment of this disclosure. The implementation environment may include a terminal 101 and a server 102.

The terminal 101 may be an electronic device such as a mobile phone, a tablet computer, an eBook reader, a multimedia player, a wearable device, or a personal computer (PC). A client of an application program may be installed on the terminal 101. In this embodiment of this disclosure, a type of the application program is not limited. The application program may be, for example, a social application program, an instant messaging application program, an online shopping application program, a payment application program, a news information application program, or a video application program. The client of the application program may display different UIs to a user, to display different information or provide different functions to the user through different UIs. In an example, the client is a client of a social application program (briefly referred to as a "social application client"). The social application client may provide various functions such as instant messaging, information reading, online shopping, online payment, file browsing, note sharing, and applets.

The server 102 is configured to provide a back-end service to the client in the terminal 101. For example, the server 102 may be a back-end server of the client. The server 102 may be one server, a server cluster including a plurality of servers, or a cloud computing service center.

The terminal 101 may communicate with the server 102 through a network 103. The network 103 may be a wired network or a wireless network.

Figure 2:
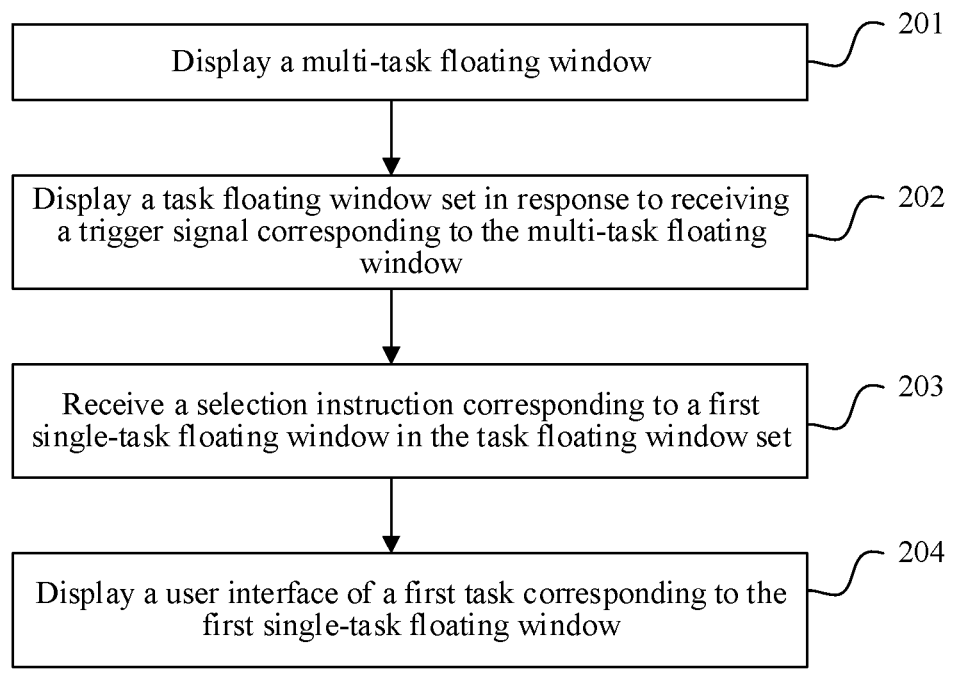
FIG. 2 is a flowchart of an interface display method according to an embodiment of this disclosure.

FIG. 2 is a flowchart of an interface display method according to an embodiment of this disclosure. The method may be applied to the terminal described above. For example, the method may be applied to the client of the application program in the terminal. The method may include the following steps (201 to 204):

Step 201. Display a multi-task floating window.

The client displays a UI, and the client may display the multi-task floating window in front of the UI. The multi-task floating window is used for implementing a function of quick switching between a plurality of tasks. The UI of the client herein may be any UI, such as a chat session interface, an official account interface, an applet interface, a file browsing interface, a note display interface, a web content display interface, a payment interface, or a game interface. This is not limited in this embodiment of this disclosure.

The multi-task floating window is displayed on top in the client, and the multi-task floating window is displayed in front of all other UIs of the client. Therefore, after the multi-task floating window is displayed, regardless of how the UIs behind the multi-task floating window are switched, normal display of the multi-task floating window is not affected.

Step 202. Display a task floating window set after a trigger signal corresponding to the multi-task floating window is received.

The multi-task floating window may be an operable control, or the multi-task floating window includes an operable control. The operable control refers to a UI control that can respond to a touch operation of a user. The user may trigger display of the task floating window set by using the operable control. For example, the user performs a trigger operation corresponding to the multi-task floating window through an operation such as tapping or pressing, and correspondingly, the client receives the trigger signal corresponding to the multi-task floating window. The client displays the task floating window set after receiving the trigger signal. For example, after the user taps the multi-task floating window, the client displays the task floating window set. In another example, after the user taps a specific operable control in the multi-task floating window, the client displays the task floating window set.

In this embodiment of this disclosure, the task floating window set includes at least one single-task floating window, and each single-task floating window is corresponding to one task. In this embodiment of this disclosure, one task is corresponding to one UI, and different tasks correspond to different UIs. The client performing a task may be understood as displaying a UI corresponding to the task. The client switching between a plurality of tasks may be understood as switching between a plurality of different UIs. The single-task floating window is used for quickly opening the UI corresponding to the task. In this embodiment of this disclosure, the UI of the task is not limited, and may be any UI of a plurality of UIs between which the client supports quickly switching. For example, the UI is a chat session interface, an official account interface, an applet interface, a file browsing interface, a note display interface, a web content display interface, a payment interface, or a game interface. This is not limited in this embodiment of this disclosure.

Figure 3:
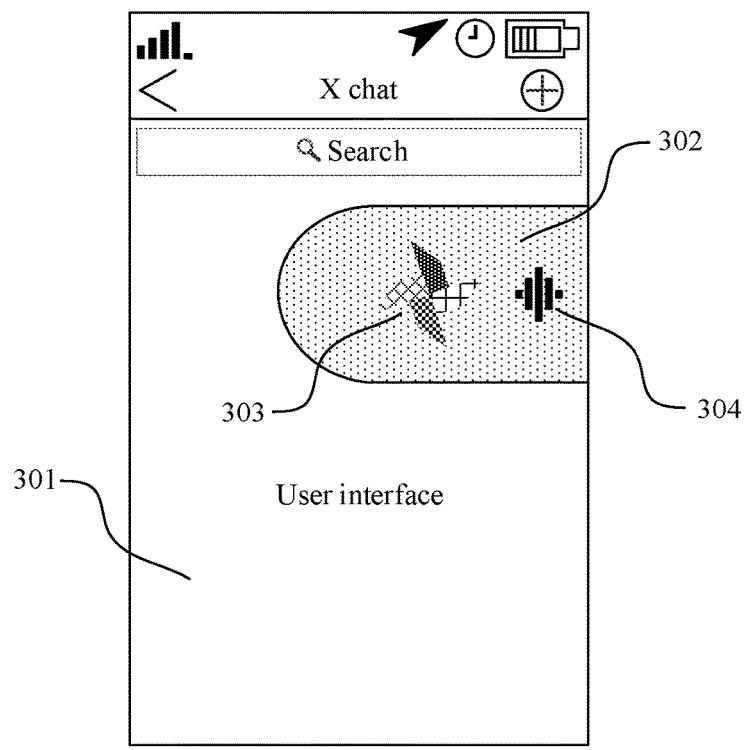
FIG. 3 is an exemplary schematic interface diagram of displaying a multi-task floating window.
Figure 4:
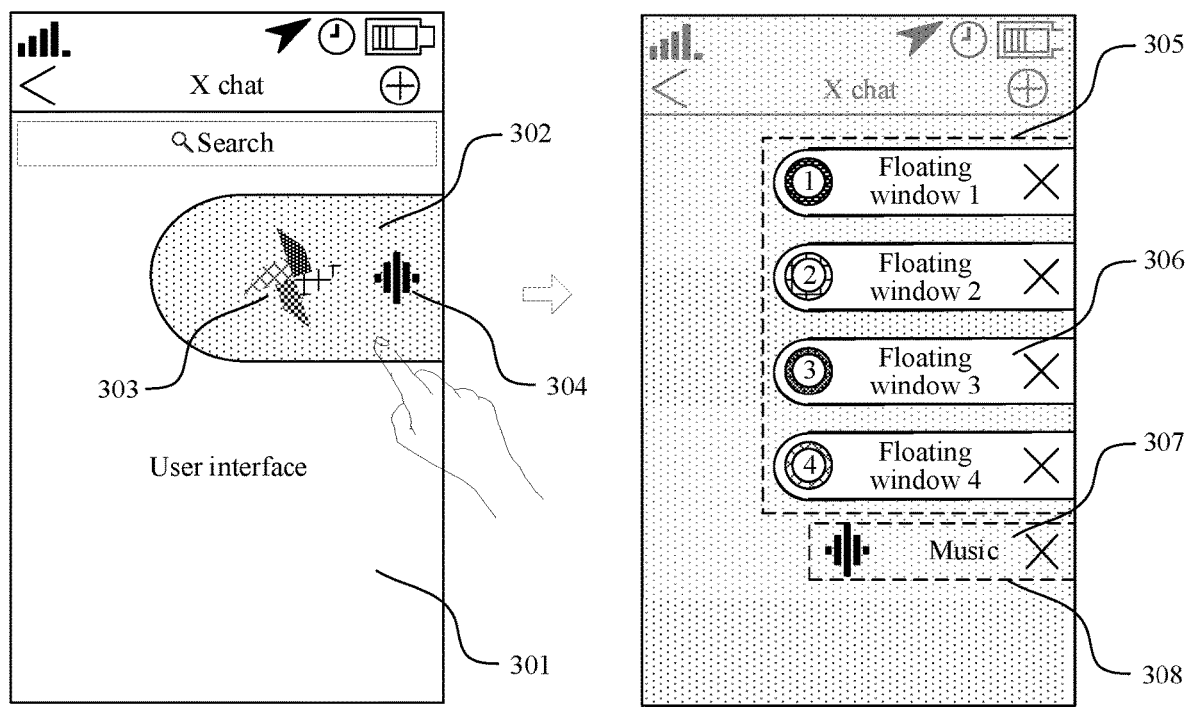
FIG. 4 is an exemplary schematic interface diagram after a multi-task floating window is triggered.

For example, as shown in FIG. 3, the client displays a multi-task floating window 302 in front of a UI 301. As shown in FIG. 4, a user taps the multi-task floating window 302, the client receives a trigger signal corresponding to the multi-task floating window 302, and the client displays a task floating window set 305. The task floating window set 305 includes several single-task floating windows 306, such as a "floating window 1", a "floating window 2", a "floating window 3", and a "floating window 4" shown in FIG. 4.

The single-task floating window may include an icon, a brief introduction, and a cancel control of a task corresponding to the single-task floating window. The icon of the task is used for identifying the task. The brief introduction of the task may be a name of the task, or a summary extracted from the UI of the task. The cancel control may be configured to cancel display of the single-task floating window.

A display manner of the task floating window set is not limited in this embodiment of this disclosure. For example, in FIG. 4, after receiving the trigger signal corresponding to the multi-task floating window 302, the client displays a floating window set display interface, and the floating window set display interface is displayed in front of other UIs of the client, that is, the client displays the floating window set display interface on top. The floating window set display interface may be semi-transparent or may be opaque. The floating window set display interface may be displayed in full screen, or may be displayed in a specific region, which is not limited in this embodiment of this disclosure. The floating window set display interface includes the task floating window set 305.

In addition, single-task floating windows included in the task floating window set may be arranged and displayed in order in a list form, or may be arranged and displayed in an array form, or may be arranged and displayed according to another specified rule, which is not limited in this embodiment of this disclosure. In FIG. 4, the single-task floating windows 306 included in the task floating window set 305 are arranged in order from top to bottom for display in the floating window set display interface.

Step 203. Receive a selection instruction corresponding to a first single-task floating window in the task floating window set.

The first single-task floating window may be any single-task floating window included in the task floating window set. A trigger operation corresponding to the selection instruction is not limited in this embodiment of this disclosure, and may be a touch operation applied to the first single-task floating window, for example, a single-tap operation, a double-tap operation, a sliding operation, or a pressing operation.

Step 204. Display a UI of a first task corresponding to the first single-task floating window.

The first single-task floating window is corresponding to the first task. After receiving the selection instruction corresponding to the first single-task floating window, the client displays the UI of the first task corresponding to the first single-task floating window.

Figure 5:
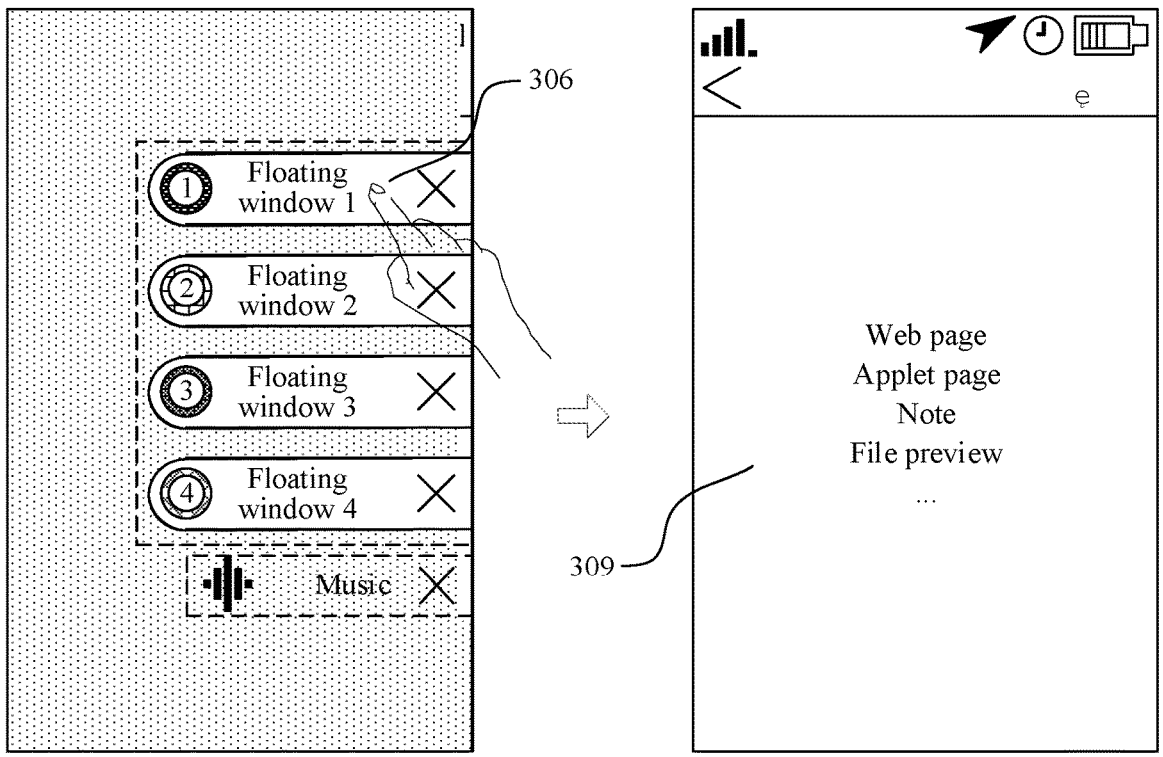
FIG. 5 is an exemplary schematic interface diagram of opening, through a single-task floating window, a task corresponding to the single-task floating window.

Referring to FIG. 5, the user taps a specific single-task floating window 306, for example, a "floating window 1" shown in FIG. 5, and correspondingly, the client receives a selection instruction corresponding to the "floating window 1". After receiving the selection instruction, the client displays a UI 309 of a task corresponding to the "floating window 1". For example, the UI 309 may be a file browsing interface, a web content display interface, an applet interface, a note display interface, or the like.

In a possible implementation, the foregoing step 204 may include the following sub-steps:
 1. Obtain recorded interface information of the first task, where the interface information may include an identifier of the UI of the first task and a browsing position when the UI of the first task is closed.
 2. Display the UI of the first task according to the interface information, and display content corresponding to the browsing position when the UI is closed.

In the foregoing manner, the previous browsing position is automatically positioned for display, thereby facilitating viewing by the user.

In an exemplary embodiment, when receiving a long press operation signal corresponding to the multi-task floating window, the client displays the task floating window set, and after a slide operation signal of moving from a trigger position of the long press operation signal to the first single-task floating window is detected, when the slide operation signal disappears, the client directly displays the UI of the first task corresponding to the first single-task floating window. In this manner, in a scenario of a one-hand operation, quick display of a UI of a specific task is triggered by a continuous operation of long pressing and sliding.

The multi-task floating window includes a task icon, and the task icon is used for indicating related information of a task for which the single-task floating window has been created. The task icon is displayed in the multi-task floating window, so that the user can learn, after viewing the task icon, of a task or tasks for which the single-task floating window or single-task floating windows has or have been created, without triggering the display of the task floating window set. The task icon includes n elements, each element is corresponding to one task for which the single-task floating window has been created, and n is a positive integer. That is, a quantity of elements included in the task icon is the same as a quantity of single-task floating windows included in the task floating window set. For example, if the quantity of elements included in the task icon is 4, it indicates that four single-task floating windows have been created, that is, the quantity of single-task floating windows included in the task floating window set is 4.

Each element displays identifier information of a UI of a task corresponding to the element. Exemplarily, when a UI of a specific task is a web page provided by a specific official account, the client displays an icon or a profile photo of the official account in the element of the task icon. When a UI of a specific task is a UI provided by a specific applet, the client displays an icon or a profile photo of the applet in the element of the task icon. The task icon is displayed in the multi-task floating window, so that not only the user can learn of a task or tasks for which a single-task floating window or single-task floating windows has or have been created, but also a related interface provider can be provided with opportunities for brand display. The client may query for and obtain identifier information of the UI based on a pre-stored database, or may parse out the identifier information of the UI from content of the UI, which is not limited in this embodiment of this disclosure. In addition, if the client does not obtain the identifier information of the UI, general identifier information may be displayed in the element of the task icon.

Exemplarily, as shown in FIG. 3 and FIG. 4, the multi-task floating window 302 includes a task icon 303, and the task icon 303 includes four elements with different display styles, respectively corresponding to four single-task floating windows 306: the "floating window 1", the "floating window 2", the "floating window 3", and the "floating window 4".

The multi-task floating window further includes a process icon, and the process icon is used for indicating related information of a running process. In this embodiment of this disclosure, a process may refer to an activity that runs continuously for a period of time, for example, a music playing process or a geographic location acquisition process. The process icon is displayed in the multi-task floating window, so that the user can learn, after viewing the process icon, of a process or processes that is or are running. In addition, each process icon may correspond to one running process, or may correspond to a plurality of running processes in a form of aggregated process icons, which is not limited in this embodiment of this disclosure.

In this embodiment of this disclosure, after receiving the trigger signal corresponding to the multi-task floating window, the client may further display a process floating window set. The process floating window set includes at least one process floating window, and each process floating window is corresponding to one process. The process floating window is used for quickly controlling a process corresponding to the process floating window, such as closing the process, pausing the process, or restarting the process. In an example, after receiving a close instruction corresponding to a target process floating window in the process floating window set, the client closes a target process corresponding to the target process floating window. The target process floating window may be any process in the process floating window set, and the target process is corresponding to the target process floating window. In the foregoing manner, the process is quickly closed without the need to first switch to an interface related to the process, thereby improving operation efficiency.

Referring to FIG. 4, when the multi-task floating window 302 includes the task icon 303 and a process icon 304, after receiving the trigger signal corresponding to the multi-task floating window 302, the client simultaneously displays the task floating window set 305 and a process floating window set 307, and the task floating window set 305 and the process floating window set 307 may be divided into two groups in a list form and arranged in order from top to bottom. The process floating window set 307 includes at least one process floating window 308. In addition, the process floating window 308 may include an icon, a brief introduction, and a cancel control of a process corresponding to the process floating window, and the cancel control may be configured to close the process corresponding to the process floating window 308. For example, when the process floating window 308 is corresponding to a music playing process, after receiving a trigger signal corresponding to the cancel control in the process floating window 308, the client closes the music playing process, and cancels display of the process floating window 308.

In addition, a size, a shape, a display position, a style, and other features of the multi-task floating window are not limited in this embodiment of this disclosure, and may be set according to an actual product form. If the multi-task floating window is displayed for the first time, the multi-task floating window is displayed at a default position. For example, the default position may be a position at an upper right edge of a screen. If the floating window is displayed for an $n^{th}$ time, the floating window is displayed at a display position of a floating window displayed for an $(n-1)^{th}$ time before display is canceled, and n is an integer greater than 1. The floating window may be displayed transparently or semi-transparently.

Based on the above, in the technical solutions provided in the embodiments of this disclosure, the multi-task floating window is displayed in front of the UI, after the trigger signal corresponding to the multi-task floating window is obtained, the task floating window set is displayed, and any single-task floating window in the task floating window set may be selected to open the UI of the task corresponding to the single-task floating window. Because the multi-task floating window supports display of a plurality of single-task floating windows, the user can create corresponding single-task floating windows for UIs of a plurality of different tasks. In this way, when switching is performed between the UIs of the plurality of tasks, the different tasks can be selected through the multi-task floating window, thereby achieving quick switching between the plurality of tasks, and adequately improving efficiency of switching between the plurality of tasks.

In addition, the multi-task floating window may be further configured to trigger display of the process floating window set. Any process floating window in the process floating window set may be selected to quickly close a corresponding process, without the need to first switch to an interface related to the process, thereby improving operation efficiency.

A creation process of the multi-task floating window and the single-task floating window is described below. The creation process may include the following steps:

1. Display a UI of a second task.

The UI of the second task may be a UI of any task executed by the client, which is not limited in this embodiment of this disclosure.

2. Obtain a floating window creation instruction corresponding to the UI of the second task.

In this embodiment of this disclosure, the floating window creation instruction is used for triggering the client to create a floating window. The floating window creation instruction is generated through triggering by a user. For example, the user may trigger generation of the floating window creation instruction through a touch operation, voice, a gesture, or an expression, or in other manners.

In a first possible implementation, the obtaining a floating window creation instruction corresponding to the UI of the second task includes the following sub-steps:

(1) Display a floating window trigger region in front of the UI of the second task when a slide signal meeting a preset condition is detected.

The preset condition may be set for any one or a combination of a plurality of characteristics of a start position, a sliding direction, a sliding speed, and a sliding distance of the slide signal. Exemplarily, the preset condition includes that the start position is at a left edge of a screen and the sliding direction is to the right. Certainly, in an actual application, the preset condition may be appropriately set with reference to actual product requirements, which is not limited in this embodiment of this disclosure.

The floating window trigger region is an interactive region used for triggering display of a floating window. A size, a shape, a display position, a style, and other features of the floating window trigger region are not limited in this embodiment of this disclosure, and may be set, with reference to the preset condition, to features that conform to operation habits of the user, to better improve interaction performance. For example, when the preset condition includes that the start position is at the left edge of the screen and the sliding direction is to the right, the floating window trigger region may be a sector region at a lower right corner of the screen.

The floating window trigger region displays a trigger icon, and the trigger icon is used for prompting the user that display of a floating window can be triggered in this region. In addition, the floating window trigger region is displayed in front of the UI of the second task, so that an operation signal for the floating window trigger region can be received. The floating window trigger region may be displayed in an opaque manner, or may be displayed semi-transparently.

(2) Obtain the floating window creation instruction corresponding to the UI of the second task when a termination position of the slide signal is inside the floating window trigger region.

When intending to trigger the floating window creation instruction, the user maintains the slide signal uninterrupted, moves a trigger position of the slide signal from outside the floating window trigger region to inside the floating window trigger region, and then terminates the slide signal (for example, releases a finger to cause the finger that triggers the slide signal to leave the screen). When the client detects that the slide signal is terminated, and the termination position is inside the floating window trigger region, the floating window creation instruction corresponding to the UI of the second task is obtained.

When the trigger position of the slide signal is moved from outside the floating window trigger region to inside the floating window trigger region, feedback information is generated. The feedback information is used for prompting the user that the floating window trigger region has been activated, and in this case, terminating the slide signal can trigger the floating window creation instruction. A form of the feedback information, such as vibration feedback, acousto-optic feedback, and graphic-text feedback, is not limited in this embodiment of this disclosure.

Figure 6:
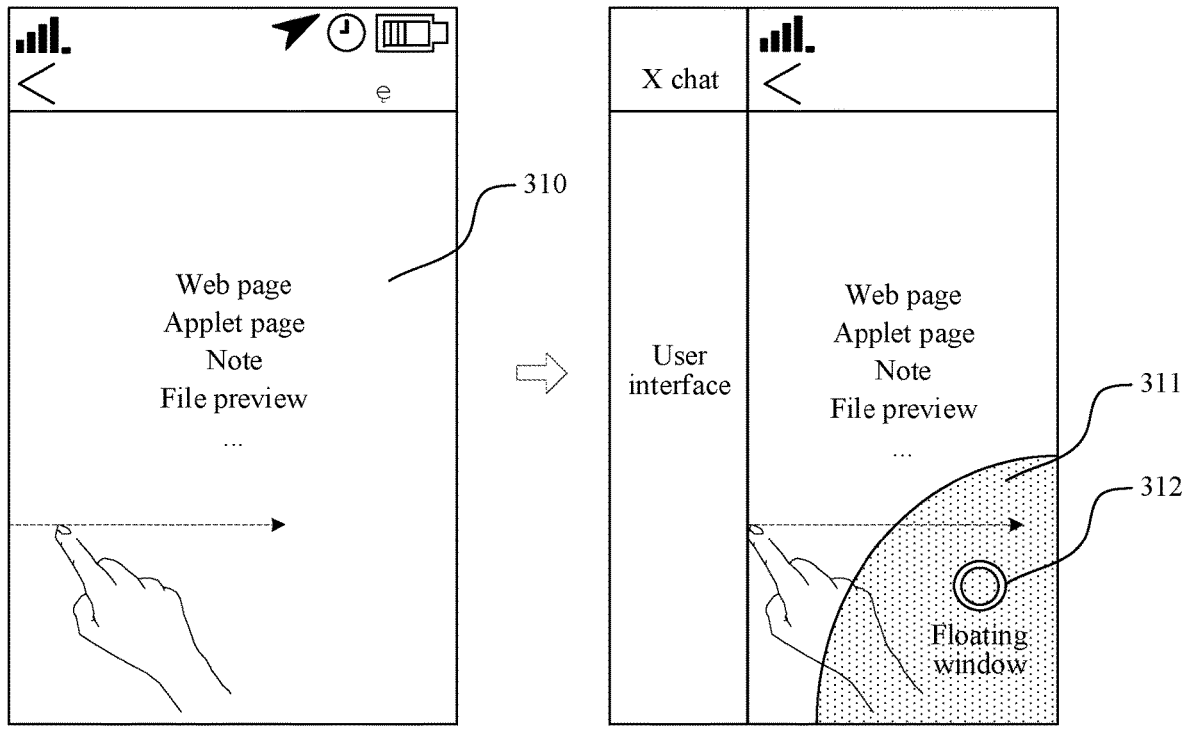
FIG. 6 is an exemplary schematic interface diagram of creating a single-task floating window.

Referring to FIG. 6, the client displays a UI 310 of the second task. A finger of the user starts sliding to the right from a left edge of a screen, and during sliding, the UI 310 of the second task shrinks to a right side of the screen, and a floating window trigger region 311 gradually appears. The floating window trigger region 311 displays a trigger icon 312. When the finger of the user moves into the floating window trigger region 311 and leaves the screen, the client obtains a floating window creation instruction corresponding to the UI 310 of the second task.

In a second possible implementation, the obtaining a floating window creation instruction corresponding to the UI of the second task includes the following sub-steps:

(1) Obtain a menu invocation instruction corresponding to the UI of the second task.

The menu invocation instruction is used for triggering the client to invoke and display a function menu. The menu invocation instruction is generated through triggering by the user. For example, the user may trigger generation of the menu invocation instruction through a touch operation, voice, a gesture, or an expression, or in other manners. In an example, when displaying the UI of the second task, the client also displays an operable control for triggering the menu invocation instruction, and the user may trigger the menu invocation instruction by using the operable control.

(2) Display the function menu on the upper level of the UI of the second task according to the menu invocation instruction.

The function menu includes a floating window display control, and the floating window display control is an operation control for triggering the floating window creation instruction. The floating window display control is a button.

In addition to including the floating window display control, the function menu may further include at least one of the following controls: an operation control for sharing the UI, an operation control for opening the UI in other applications, an operation control for saving the UI as notes, an operation control for editing a tag corresponding to the UI, and the like, which is not limited in this embodiment of this disclosure.

(3) Obtain a floating window creation instruction corresponding to the UI of the second task when a trigger signal corresponding to the floating window display control is obtained.

When the floating window display control is a button, if the user taps the floating window display control, the client obtains the trigger signal corresponding to the floating window display control. When the client obtains the trigger signal corresponding to the floating window display control, the floating window creation instruction corresponding to the UI of the second task is obtained.

Figure 7:
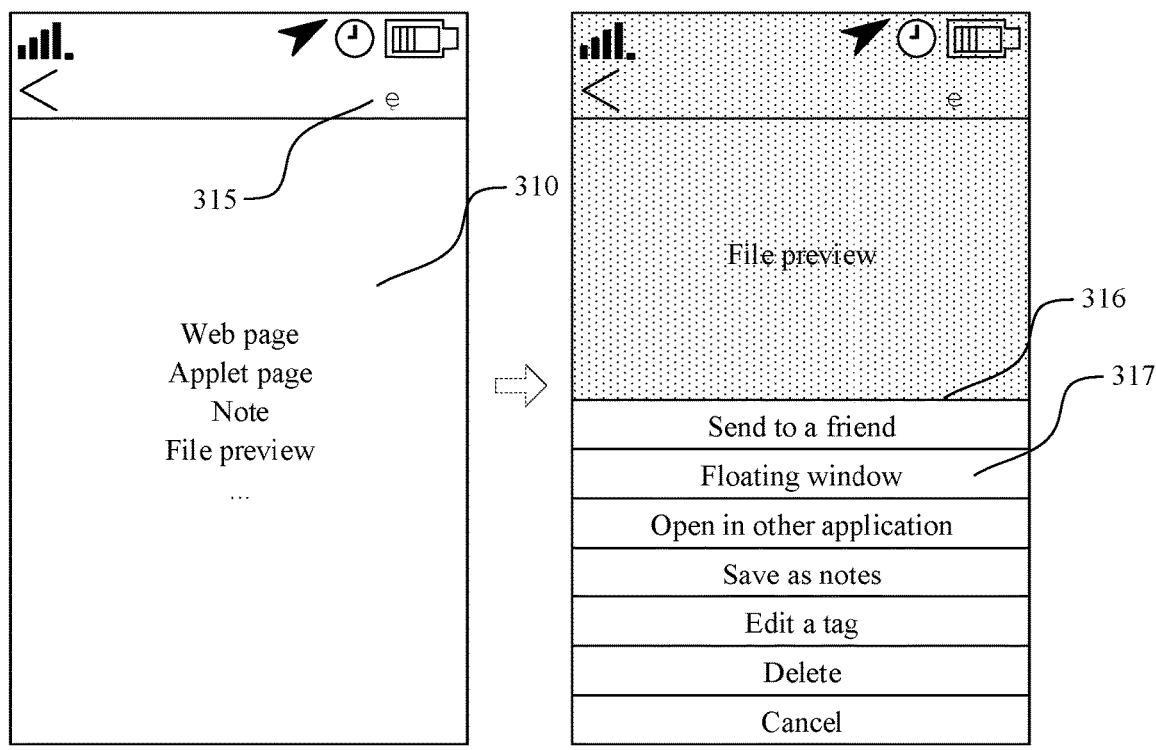
FIG. 7 is another exemplary schematic interface diagram of creating a single-task floating window.

Referring to FIG. 7, the client displays the UI 310 of the second task, the user taps a [ . . . ] control 315 at an upper right corner to trigger the client to display a function menu 316. The function menu 316 includes a floating window display control 317. After the user taps the floating window display control 317, the client obtains a floating window creation instruction corresponding to the UI 310 of the second task.

Certainly, the two manners described above of generating the floating window creation instruction through triggering are merely exemplary and interpretive, and other manners adopted for generating the floating window creation instruction through triggering are not limited in this embodiment of this disclosure.

3. Create the multi-task floating window according to the floating window creation instruction if the multi-task floating window is not created, and add a single-task floating window corresponding to the second task to a task floating window set.

After the client receives the floating window creation instruction corresponding to the UI of the second task, if the client has not currently created the multi-task floating window, the client creates the multi-task floating window, and adds the single-task floating window corresponding to the second task to the task floating window set. In this way, after tapping the multi-task floating window, the user can view the single-task floating window corresponding to the second task in the task floating window set. The single-task floating window corresponding to the second task is used for quickly opening the UI of the second task.

If the multi-task floating window includes a task icon, the client displays the task icon in the created multi-task floating window, and the task icon includes an element corresponding to the second task.

4. Add the single-task floating window corresponding to the second task to the task floating window set according to the floating window creation instruction if the multi-task floating window has been created.

After the client receives the floating window creation instruction corresponding to the UI of the second task, if the client has already created the multi-task floating window, the client does not need to repeatedly create the multi-task floating window, but needs to add only the single-task floating window corresponding to the second task to the task floating window set.

If the multi-task floating window includes the task icon, the client further needs to update the task icon. For example, the client switches the task icon included in the multi-task floating window from a first display style to a second display style, where the task icon in the second display style includes more elements corresponding to the second task than the task icon in the first display style. The user may learn, through change of the display style of the task icon, that the single-task floating window corresponding to the second task has been added.

Figure 8:
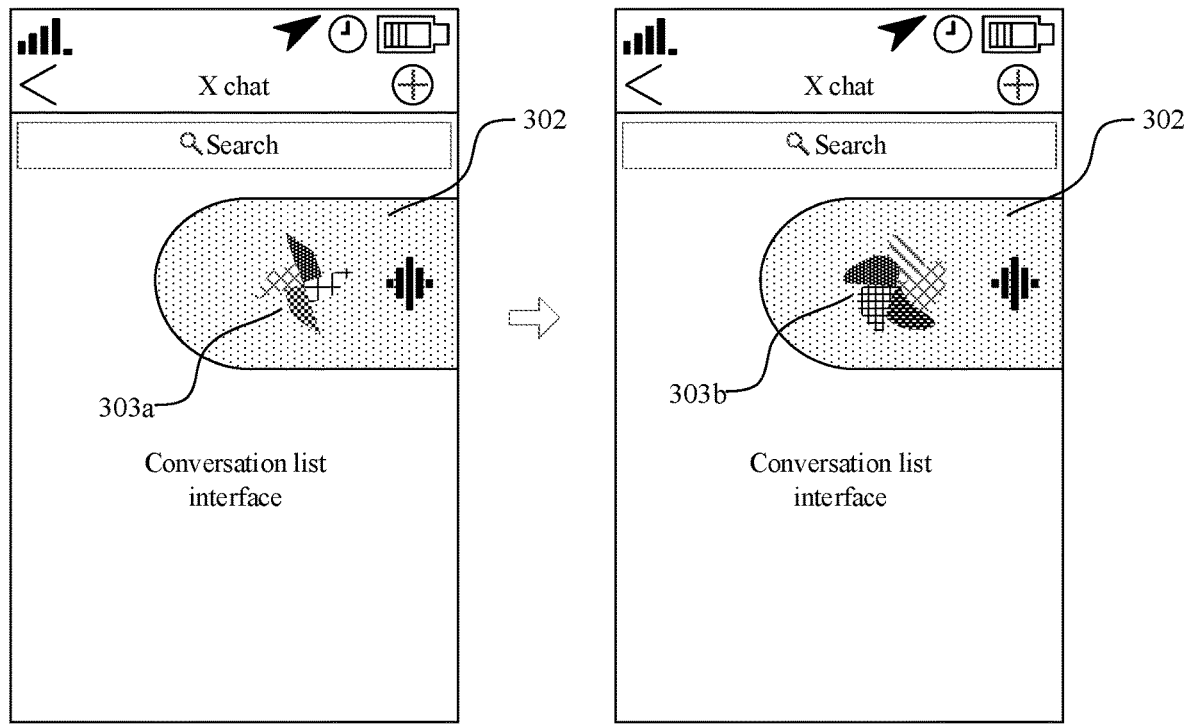
FIG. 8 is an exemplary schematic interface diagram of switching task icon in a multi-task floating window.

As shown in FIG. 8, a multi-task floating window 302 originally includes a task icon 303*a* in the first display style, after a new single-task floating window is added, the multi-task floating window 302 displays a task icon 303*b* in the second display style. The task icon 303*b* in the second display style includes one more element corresponding to the foregoing newly added task than the task icon 303*a* in the first display style.

In addition, a maximum quantity of single-task floating windows allowed to be created may or may not be limited. If the maximum quantity of single-task floating windows is limited, when the first possible implementation described above is adopted to generate the floating window creation instruction through triggering, when the slide signal meeting the preset condition is detected, the client determines whether a quantity of created single-task floating windows has reached a preset threshold. If the quantity of created single-task floating windows has not reached the preset threshold, the client displays the trigger icon in the floating window trigger region, and displays prompt information (marked as "first prompt information" herein) next to the trigger icon. The first prompt information is used for prompting that the quantity of created single-task floating windows has not reached the preset threshold, and in this case, the single-task floating window is allowed to be added. If the quantity of created single-task floating windows has reached the preset threshold, the client displays prompt information (marked as "second prompt information" herein) in the floating window trigger region. The second prompt information is used for prompting that the quantity of created single-task floating windows has reached the preset threshold, and in this case, the single-task floating window is not allowed to be added.

Figure 9:
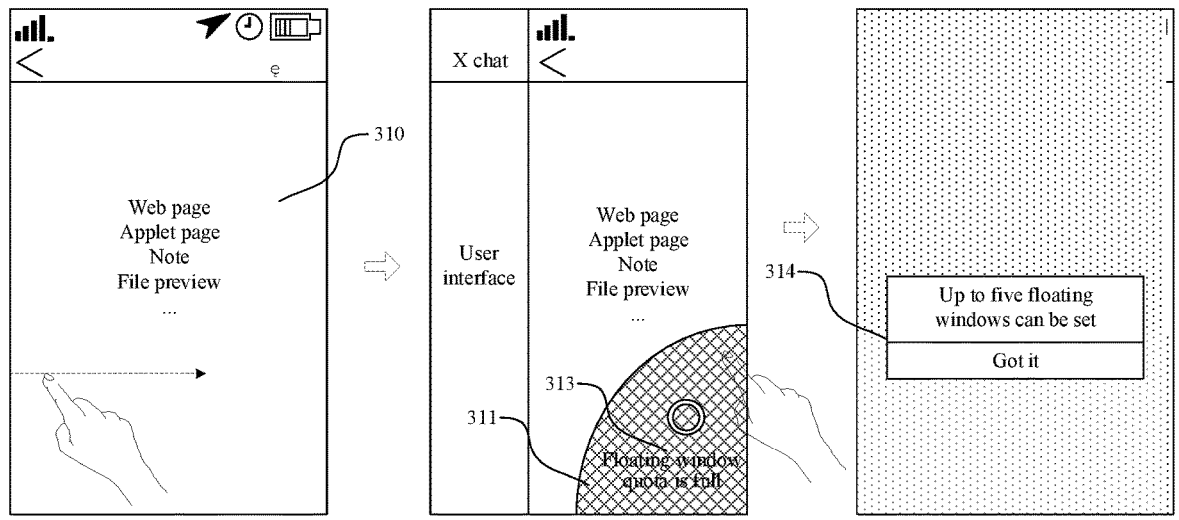
FIG. 9 is an exemplary schematic interface diagram of prompting that a quantity of single-task floating windows reaches a preset threshold.

Referring to FIG. 9, the client displays a UI 310 of the second task. When the slide signal meeting the preset condition is detected, a floating window trigger region 311 is displayed in front of the UI 310 of the second task. If the quantity of created single-task floating windows has reached the preset threshold, the client displays prompt information 313 (that is, the prompt information that "the floating window quota is full" shown in FIG. 8) in the floating window trigger region 311. The prompt information 313 is used for prompting that the quantity of created single-task floating windows has reached the preset threshold. Further, when a trigger position of the slide signal is moved from outside the floating window trigger region 311 to inside the floating window trigger region 311, the client generates feedback information for prompting that the single-task floating window corresponding to the second task cannot be created. The feedback information may be tactile feedback information such as vibration feedback information, for example, two vibrations. In this case, the user releases the finger, and the client displays reminder information 314. The reminder information 314 may be used for indicating the maximum quantity of single-task floating windows allowed to be created.

Figure 10:
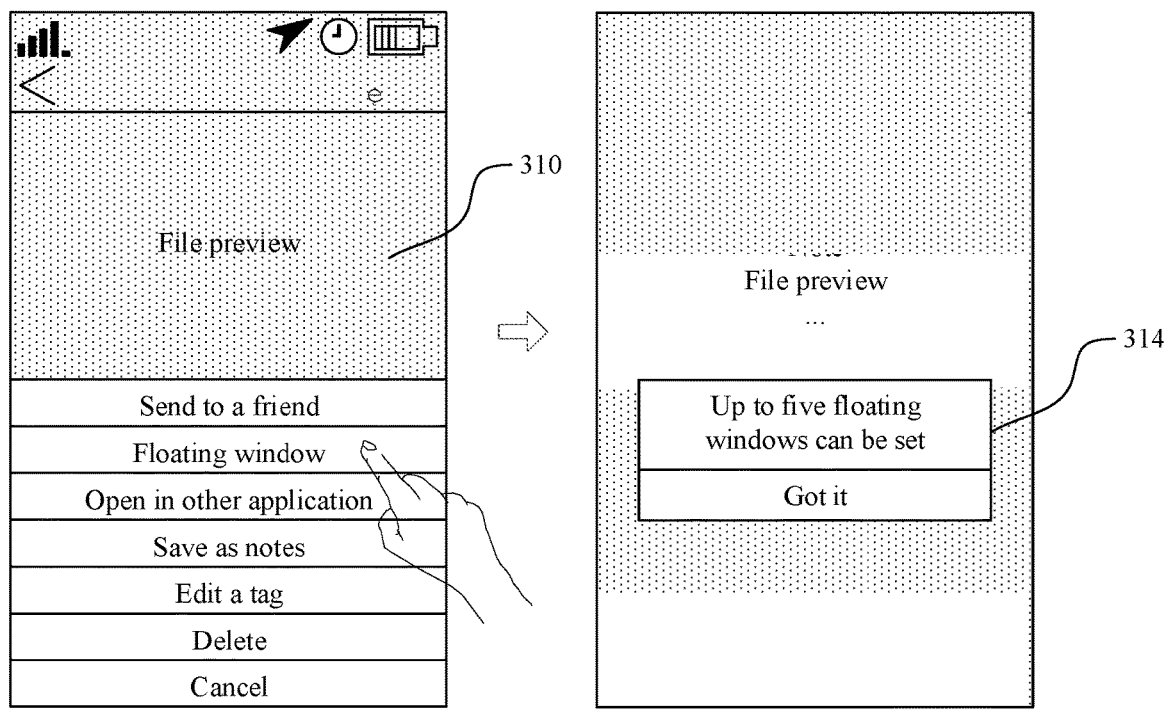
FIG. 10 is another schematic interface diagram of prompting that a quantity of single-task floating windows reaches a preset threshold.

Similarly, as shown in FIG. 10, if the second possible implementation is adopted, after the client obtains the floating window creation instruction corresponding to the UI 310 of the second task, if the quantity of created single-task floating windows has reached the preset threshold, the client also displays the reminder information 314, and the reminder information 314 is used for indicating the maximum quantity of single-task floating windows allowed to be created.

Based on the above, in the technical solutions provided in the embodiments of this disclosure, according to the touch operation of the user for creating the floating window, the client may create a current task as the single-task floating window and display the single-task floating window in the task floating window set, and may correspondingly change the display style of the task icon in the multi-task floating window. The user can learn, through the change of the display style of the task icon, that the single-task floating window has been added, thereby further improving user experience and optimizing an interface display effect.

In an exemplary embodiment, a display manner and a display position of the multi-task floating window are not fixed. For example, the display position of the multi-task floating window may be moved.

Figure 11:
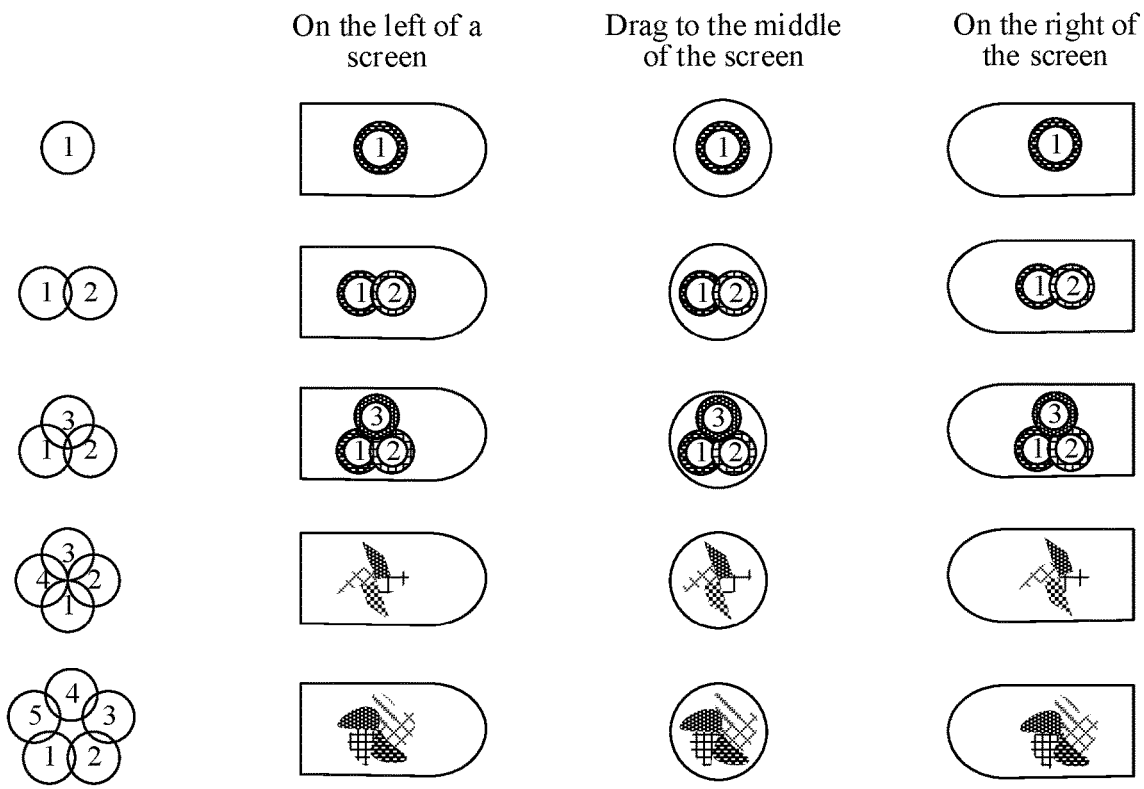
FIG. 11 is an exemplary schematic interface diagram of display styles of a multi-task floating window and a task icon.

FIG. 11 shows display styles of the multi-task floating window and the task icon when the multi-task floating window includes the task icon. In this embodiment of this disclosure, an example in which the multi-task floating window can allow up to five single-task floating windows is used. A quantity of elements included in the task icon is the same as the quantity of created single-task floating windows. In addition, the multi-task floating window may be dragged on the screen. FIG. 11 shows styles of the multi-task floating window when being displayed on the left side of the screen, in the middle of the screen, and on the right side of the screen.

Figure 12:
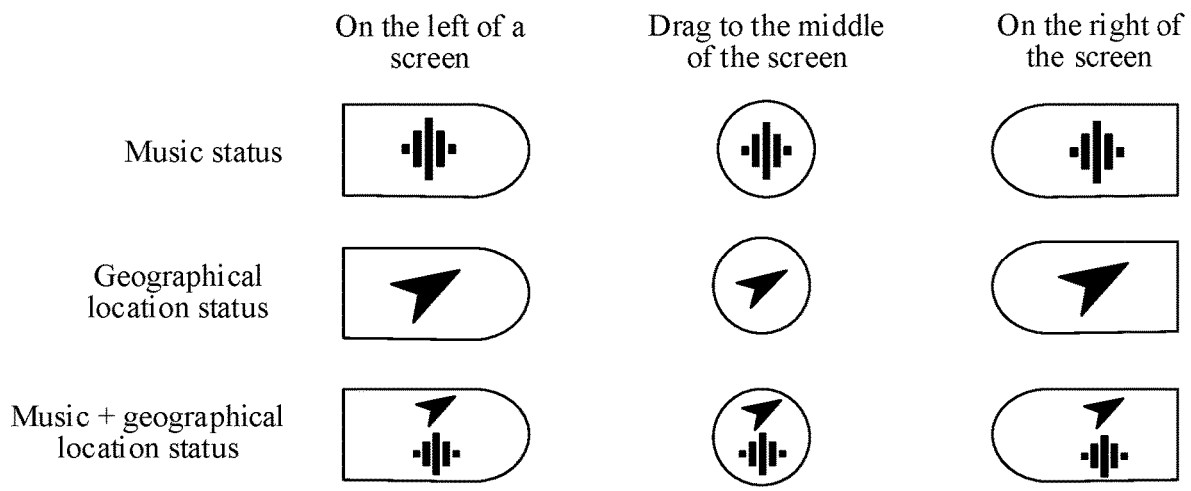
FIG. 12 is an exemplary schematic interface diagram of display styles of a multi-task floating window and a process icon.

FIG. 12 shows display styles of the multi-task floating window and a process icon when the multi-task floating window includes the process icon. An example in which each process is corresponding to one process icon is used in this embodiment of this disclosure. Similarly, the multi-task floating window may be dragged on the screen. FIG. 12 shows styles of the multi-task floating window when being displayed on the left side of the screen, in the middle of the screen, and on the right side of the screen.

Figure 13:
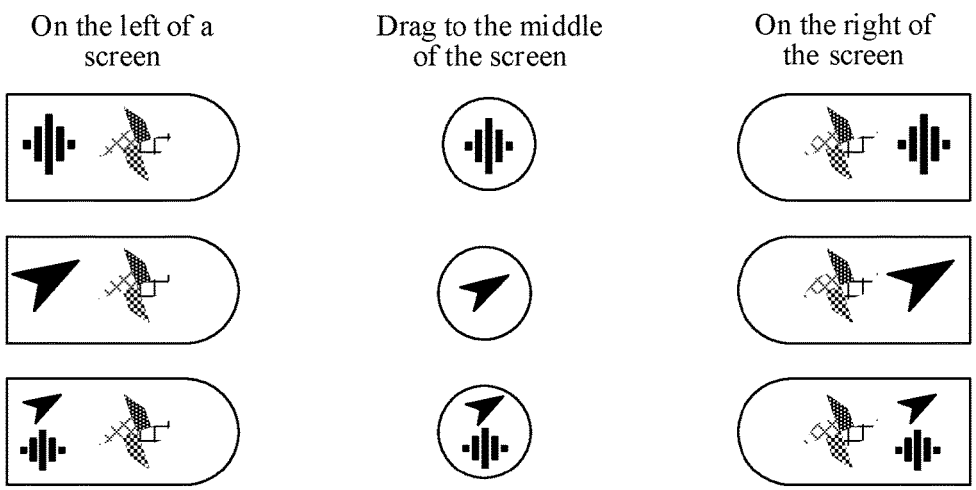
FIG. 13 is an exemplary schematic interface diagram of display styles of a multi-task floating windows.

FIG. 13 shows display styles of the multi-task floating window when the multi-task floating window includes the task icon and the process icon.

In this embodiment of this disclosure, the user may drag a position of the multi-task floating window, and the client determines a display position of a task floating window according to a termination position of a drag operation of the user. The client may receive a drag operation signal corresponding to the multi-task floating window. When it is detected that the drag operation signal disappears, the multi-task floating window is displayed at a screen edge position corresponding to a disappearance position of the drag operation signal. For example, when the disappearance position of the drag operation signal is at a left side of the screen, the client displays the multi-task floating window on a left edge of the screen. For example, when the drag operation signal disappears, the client attaches the multi-task floating window to the left edge of the screen for display in a form of attachment animation. When the disappearance position of the drag operation signal is at a right side of the screen, the client displays the multi-task floating window on a right edge of the screen. For example, when the drag operation signal disappears, the client attaches the multi-task floating window to the right edge of the screen for display in the form of attachment animation.

Based on the above, the task icon and the process icon of the multi-task floating window can clearly display a task and a running process corresponding to the task icon and the process icon, and the user can autonomously change the display position of the multi-task floating window, thereby expanding functions of the multi-task floating window.

In an exemplary embodiment, after displaying a task floating window set or a process floating window set, the client may further obtain a close instruction corresponding to a single-task floating window or a process floating window, and cancel display of the single-task floating window or the process floating window according to the close instruction.

Figure 14:
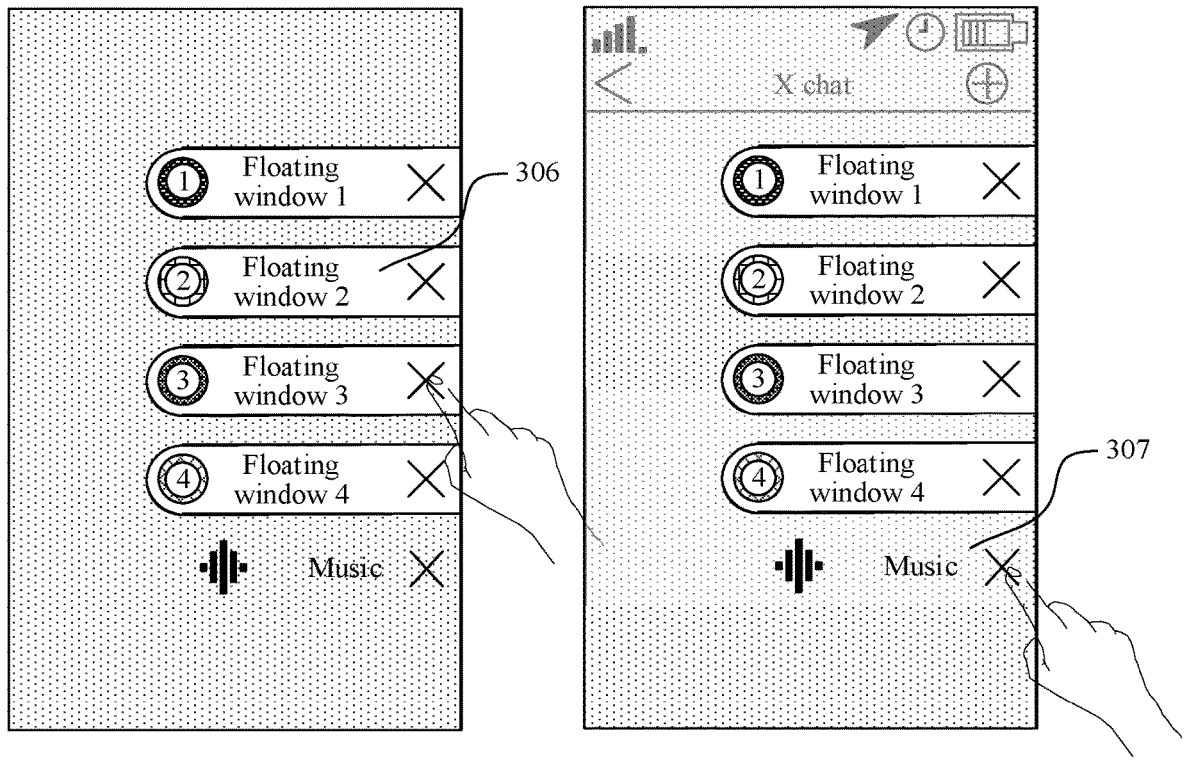
FIG. 14 is an exemplary schematic interface diagram of canceling display of a single-task floating window or a process floating window.

In a possible implementation, referring to FIG. 14, a process in which the client cancels display of a single-task floating window 306 or a process floating window 307 includes: obtaining a trigger signal corresponding to a close control in the single-task floating window 306 or the process floating window 307, and canceling display of the single-task floating window 306, or canceling display of the process floating window 307 and closing a corresponding process. When the close control is a button, the user taps the close control, and the client obtains the trigger signal corresponding to the close control. In addition, when the single-task floating window 306 or the process floating window 307 is closed, display positions of the remaining single-task floating window 306 or the process floating window 307 may further be schematically adjusted, which is not limited in this embodiment of this disclosure.

Figure 15:
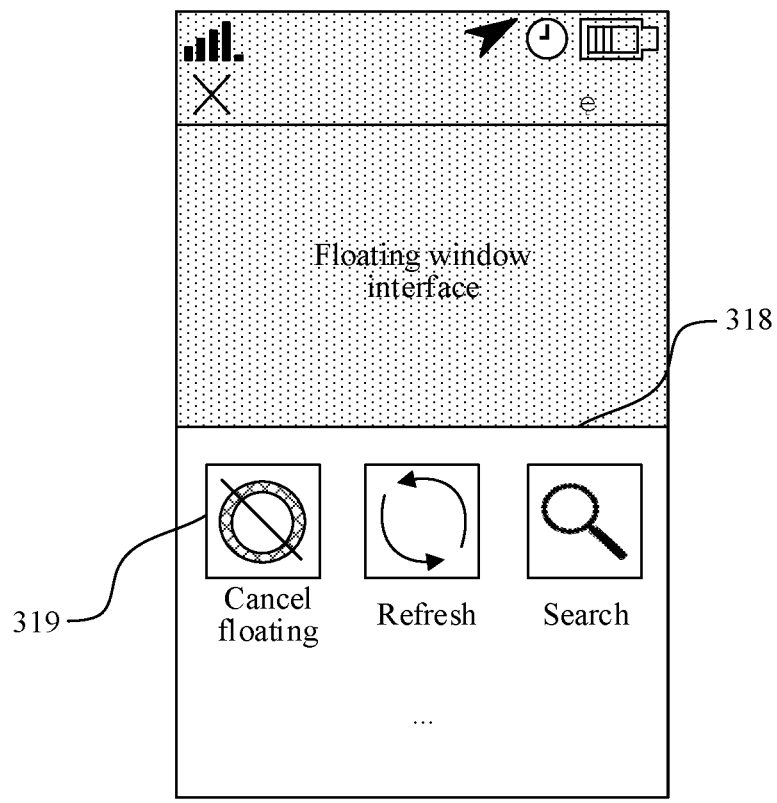
FIG. 15 is another exemplary schematic interface diagram of canceling display of a single-task floating window.

In another possible implementation, referring to FIG. 15, a process in which the client cancels display of a single-task floating window includes: obtaining, by the client after triggering display of a UI of a task corresponding to the single-task floating window through the single-task floating window, a menu invocation instruction corresponding to the UI; and displaying a function menu 318 in front of the UI according to the menu invocation instruction, the function menu 318 including a close control 319, and the close control 319 being an operation control for triggering a close instruction corresponding to the single-task floating window. The close control 319 is a button, and if a trigger signal corresponding to the close control is obtained, display of a single-task floating window corresponding to the close control is canceled. When the close control 319 is a button, if the user taps the close control 319, the client obtains the trigger signal corresponding to the close control, and the client cancels display of the single-task floating window corresponding to the close control 319.

In still another possible implementation, the client may alternatively cancel display of the multi-task floating window, and the process includes: After displaying the multi-task floating window, the client may further obtain a close instruction corresponding to the multi-task floating window, and cancel display of the multi-task floating window according to the close instruction. The close instruction is used for triggering the client to cancel display of the multi-task floating window, and the close instruction is generated through triggering by the user. For example, the user may trigger generation of the close instruction through a touch operation, voice, a gesture, or an expression, or in other manners.

That the client cancels display of the multi-task floating window includes the following steps: displaying a floating window canceling region in front of a currently displayed UI when a drag operation signal corresponding to the multi-task floating window is obtained; and canceling display of the multi-task floating window if a termination position of the drag operation signal is inside the floating window canceling region. The floating window canceling region is an interactive region used for triggering cancellation of display of the multi-task floating window. A size, a shape, a display position, a style, and other features of the floating window canceling region are not limited in this embodiment of this disclosure. The size, the shape, and the display position of the floating window canceling region are the same as those of the floating window trigger region. However, a color of the floating window canceling region is different from that of the floating window trigger region for distinction. The floating window canceling region displays a cancel icon, and the cancel icon is used for prompting the user that cancelation of display of the multi-task floating window may be triggered in this region.

If the termination position of the drag operation signal is outside the floating window canceling region, the client displays the multi-task floating window at a screen edge position corresponding to the termination position of the drag operation signal.

In addition, when the client cancels display of the multi-task floating window, all single-task floating windows and process floating windows are simultaneously deleted, and all the process floating windows are closed.

Moreover, when display of the multi-task floating window is canceled, the client records a display position of the multi-task floating window before the display is canceled, and when the multi-task floating window is displayed next time, the multi-task floating window is displayed at the display position recorded above. In the foregoing manner, a user habit is memorized, and the multi-task floating window is displayed at a suitable position that meets a user requirement.

Based on the above, in the technical solutions provided in the embodiments of this disclosure, the user can move, close, and perform other operations on the multi-task floating window, the single-task floating window, and the process floating window, which is more flexible.

To enable a multi-task window to be displayed in front of a UI of the client, the client may create two window objects, recorded as a first window object and a second window object.

The first window object is used for carrying the multi-task window and display of content related to the multi-task window. For example, display of the task floating window set and the process floating window set. The second window object is used for carrying display of the UI of the client. The first window object is displayed in front of the second window object. In this way, it can be ensured that the multi-task floating window is displayed on top in the client, and the multi-task floating window is displayed in front of all other UIs of the client. Therefore, after the multi-task floating window is displayed, regardless of how the UIs behind the multi-task floating window are switched, normal display of the multi-task floating window is not affected.

An iOS system is used as an example, and the window object is a UIWindow object. The client may create a first UIWindow object and a second UIWindow object. The first UIWindow object is used for carrying the multi-task window and display of content related to the multi-task window. The second UIWindow object is used for carrying display of the UI of the client.

In addition, when the client generates a single-task floating window corresponding to a specific task, the task generates a unique identifier and ancillary information. The unique identifier is used for uniquely identifying the task. Different tasks correspond to different unique identifiers. The unique identifier may be recorded as taskkey. The ancillary information refers to information such as an icon and a brief introduction related to the task. The ancillary information may be recorded as taskdata. After obtaining the unique identifier and the ancillary information of the task, a floating window manager can display the corresponding single-task floating window. The floating window manager can distinguish a switching request for a UI of a different task by using a unique identifier of the task, and can further display information such as an icon and a brief introduction of the task in the single-task floating window through ancillary information of the task, thereby achieving coexistence of a plurality of tasks and event isolation. In addition, the floating window manager described above is a functional module, in the client, configured to implement related functions of the multi-task floating window.

An example in which the task is an applet task is used, and a process of creating a single-task floating window corresponding to the task includes the following steps:

1. The client displays a UI of the applet task, and receives a floating window creation instruction corresponding to the UI of the applet task.
2. The applet task generates a unique identifier and ancillary information, and sends the unique identifier and the ancillary information to the floating window manager through an interface.
3. The floating window manager detects whether the received unique identifier already exists in a floating window list of the floating window manager, and whether a quantity of created single-task floating windows has reached a preset threshold, so as to determine whether to allow creation of the single-task floating window corresponding to the applet task.
4. The floating window manager sends a decision result to the applet task in a form of a return value. If the return value is YES, it indicates that creation of the single-task floating window corresponding to the applet task is allowed. If the return value is NO, it indicates that creation of the single-task floating window corresponding to the applet task is rejected.
5. The applet task starts executing a floating window creation animation if the return value received by the applet task is YES, that is, the UI of the applet task is scaled down.
6. The floating window manager creates the single-task floating window corresponding to the applet task, and updates the multi-task floating window.

During creation of the single-task floating window corresponding to the applet task, the applet task executes a part of animation (that is, the floating window creation animation described above), and the floating window manager also executes a part of animation (that is, an animation for updating the multi-task floating window). Therefore, to ensure synchronization of the two parts of animations, when starting executing the animation, the applet task may notify a timestamp at which execution of the animation starts and duration of the animation to the floating window manager by invoking a related function, to facilitate synchronization by the floating window manager.

An example in which the task is an applet task is still used, and a process of quickly displaying a UI of the applet task through a single-task floating window corresponding to the task includes the following steps:

1. The floating window manager receives a selection instruction of the single-task floating window corresponding to the applet task, associates the selection instruction to the applet task by using a unique identifier corresponding to the single-task floating window, and sends an interface display notification to the applet task. The interface display notification may carry the unique identifier corresponding to the single-task floating window.
2. The applet task performs verification on the unique identifier carried in the interface display notification after receiving the interface display notification, and displays the UI of the applet task after the verification succeeds.

In addition, when starting displaying the UI of the applet task, the applet task may further notify a timestamp at which the UI starts to be displayed to the floating window manager by invoking a related function, to facilitate execution of related animation synchronization by the floating window manager.

The foregoing only uses the applet as an example to describe the process of creating the single-task floating window corresponding to the applet and the process of quickly displaying the UI through the single-task floating window corresponding to the applet, and is also applicable to other types of tasks such as a web page, a note, a file preview, and an official account. Details refer to the embodiments described herein.

Moreover, for the process running on the client, the floating window manager may create a process floating window corresponding to the process, and control a state of the process based on the process floating window.

A music playing process is used as an example. When the floating window manager creates a process floating window corresponding to the music playing process, a unique identifier and ancillary information of the process are also obtained. When a user taps a close button in the process floating window, the floating window manager may associate the music playing process with the unique identifier corresponding to the process floating window, and send a process closing notification to the music playing process. The process closing notification may carry the unique identifier corresponding to the process floating window. After receiving the process closing notification, the music playing process performs verification on the unique identifier carried in the process closing notification, and closes the process after the verification succeeds, that is, stops playing music.

Based on the above, in the technical solutions provided in the embodiments of this disclosure, the first window object and the second window object are created, the first window object is used for carrying the multi-task window and display of content related to the multi-task window, and the second window object is used for carrying display of the UI of the client. The first window object is set to be displayed in front of the second window object, so that it can be ensured that the multi-task floating window is displayed on top in the client, thereby achieving isolation between the multi-task floating window and the UI of the client, and achieving a drag-and-drop effect of the multi-task floating window.

In addition, a corresponding unique identifier is assigned to each task or process, and different tasks and different processes are distinguished by using the unique identifiers, so that the multi-task floating window can support coexistence of a plurality of tasks and a plurality of processes, thereby achieving quick switching of a plurality of tasks and quick closing of a process.

The following describes apparatus embodiments of this disclosure, which can be used to execute the method embodiments of this disclosure. For details not disclosed in the apparatus embodiments of this disclosure, refer to the method embodiments of this disclosure.

Figure 16:
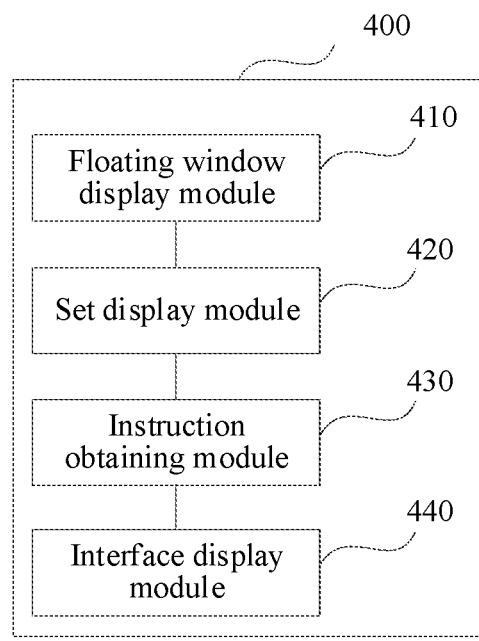
FIG. 16 is a block diagram of an interface display apparatus according to an embodiment of this disclosure.

FIG. 16 is a block diagram of an interface display apparatus according to an embodiment of this disclosure. The apparatus 400 has functions of implementing the foregoing method embodiments. The functions may be implemented by hardware, or may be implemented by hardware executing corresponding software. The apparatus 400 may be the terminal described above, or may be disposed in the terminal. The apparatus 400 may include a floating window display module 410, a set display module 420, an instruction obtaining module 430, and an interface display module 440.

The term module (and other similar terms such as unit, submodule, etc.) may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module. A module is configured to perform functions and achieve goals such as those described in this disclosure, and may work together with other related modules, programs, and components to achieve those functions and goals.

The floating window display module 410 is configured to display a multi-task floating window, the multi-task floating window being displayed in front of a UI of a client.

The set display module 420 is configured to display a task floating window set after a trigger signal corresponding to the multi-task floating window is received, the task floating window set including at least one single-task floating window, and each single-task floating window being corresponding to one task.

The instruction obtaining module 430 is configured to receive a selection instruction corresponding to a first single-task floating window in the task floating window set.

The interface display module 440 is configured to display a UI of a first task corresponding to the first single-task floating window.

In an exemplary embodiment, the multi-task floating window includes a task icon, and the task icon is used for indicating related information of a task for which the single-task floating window has been created.

In an exemplary embodiment, the task icon includes n elements, each element is corresponding to one task for which the single-task floating window has been created, and n is a positive integer.

In an exemplary embodiment, the multi-task floating window further includes a process icon, and the process icon is used for indicating related information of a running process.

Figure 17:
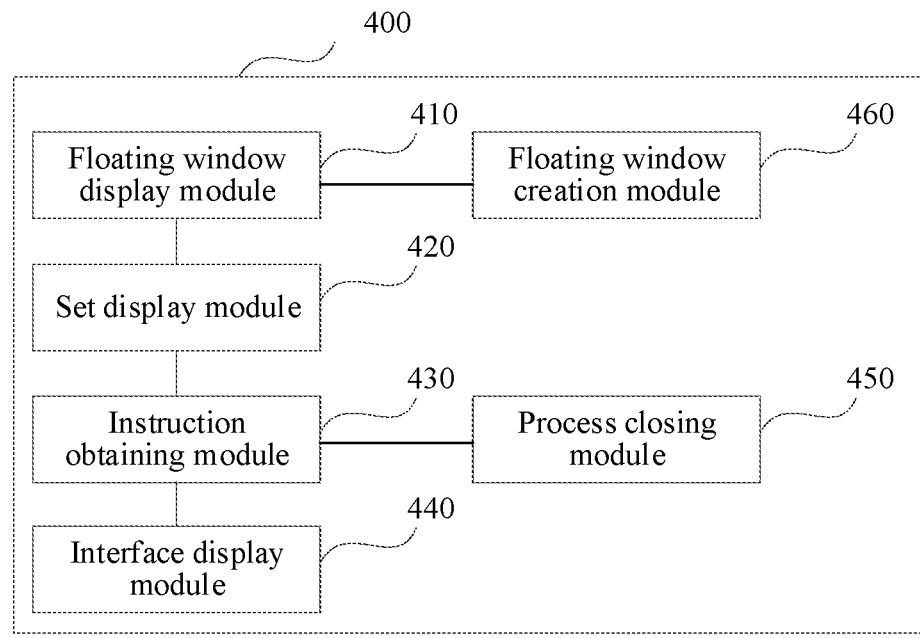
FIG. 17 is a complete block diagram of an interface display apparatus according to an embodiment of this disclosure.

In an exemplary embodiment, as shown in FIG. 17, the apparatus 400 further includes a process closing module 450.

The set display module 420 is further configured to display a process floating window set after the trigger signal corresponding to the multi-task floating window is received, the process floating window set including at least one process floating window, and each process floating window being corresponding to one process.

The instruction obtaining module 430 is further configured to receive a close instruction corresponding to a target process floating window in the process floating window set.

The process closing module 450 is configured to close a target process corresponding to the target process floating window.

In an exemplary embodiment, as shown in FIG. 17, the apparatus 400 further includes a floating window creation module 460.

The interface display module 440 is further configured to display a UI of a second task.

The instruction obtaining module 430 is further configured to obtain a floating window creation instruction corresponding to the UI of the second task.

The floating window creation module 460 is configured to update the task icon included in the multi-task floating window according to the floating window creation instruction, and add a single-task floating window corresponding to the second task to the task floating window set.

In an exemplary embodiment, the floating window creation module 460 is configured to switch the task icon included in the multi-task floating window from a first display style to a second display style, where the task icon in the second display style includes more elements corresponding to the second task than the task icon in the first display style.

In an exemplary embodiment, the apparatus 400 further includes a trigger region display module, a prompt information display module, and a feedback information generation module (not shown in the figure).

The trigger region display module is configured to display a floating window trigger region in front of the UI of the second task when a slide signal meeting a preset condition is detected.

The prompt information display module is configured to display prompt information in the floating window trigger region when a quantity of created single-task floating windows has reached a preset threshold, the prompt information being used for prompting that the quantity of created single-task floating windows has reached the preset threshold.

The feedback information generation module is configured to generate, when a trigger position of the slide signal is moved from outside of the floating window trigger region to inside of the floating window trigger region, feedback information for prompting that the single-task floating window corresponding to the second task cannot be created.

In an exemplary embodiment, the apparatus 400 further includes a reminder information display module (not shown in the figure).

The reminder information display module is configured to display reminder information when the quantity of created single-task floating windows has reached the preset threshold, the reminder information being used for indicating a maximum quantity of single-task floating windows allowed to be created.

In an exemplary embodiment, the apparatus 400 further includes a signal receiving module and a floating window moving module (not shown in the figure).

The signal receiving module is configured to receive a drag operation signal corresponding to the multi-task floating window.

The floating window moving module is configured to display the multi-task floating window at a screen edge position corresponding to a disappearance position of the drag operation signal in a case of detecting that the drag operation signal disappears.

In an exemplary embodiment, the apparatus 400 further includes: a position recording module (not shown in the figure).

The position recording module is configured to record, when display of the multi-task floating window is canceled, a display position of the multi-task floating window before the display is canceled.

The floating window display module 410 is further configured to display the multi-task floating window at the display position when the multi-task floating window is displayed next time.

Based on the above, in the technical solutions provided in the embodiments of this disclosure, the multi-task floating window is displayed in front of the UI, after the trigger signal corresponding to the multi-task floating window is obtained, the task floating window set is displayed, and any single-task floating window in the task floating window set may be selected to open the UI of the task corresponding to the single-task floating window. Because the multi-task floating window supports display of a plurality of single-task floating windows, the user may create corresponding single-task floating windows for UIs of a plurality of different tasks. In this way, when switching is performed between the UIs of the plurality of tasks, the different tasks can be selected through the multi-task floating window, thereby achieving quick switching between the plurality of tasks, and adequately improving efficiency of switching between the plurality of tasks.

When the apparatus provided in the foregoing embodiments implements functions of the apparatus, the division of the foregoing functional modules is merely an example for description. In the practical application, the functions may be assigned to and completed by different functional modules according to the requirements, that is, the internal structure of the device is divided into different functional modules, to implement all or some of the functions described above. In addition, the apparatus provided in the foregoing embodiment belongs to the same conception as the method embodiment. For a specific implementation process thereof, refer to the method embodiment. Details refer to the embodiments described herein.

Figure 18:
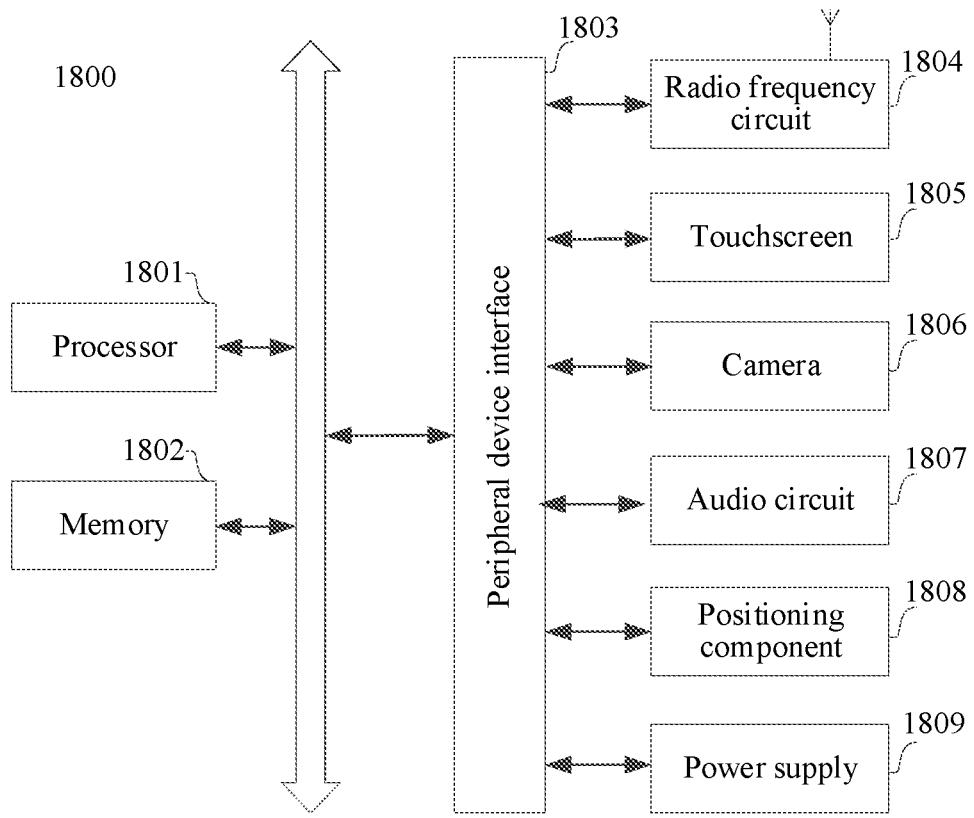
FIG. 18 is a structural block diagram of a terminal according to an embodiment of this disclosure.

FIG. 18 is a structural block diagram of a terminal 1800 according to an embodiment of this disclosure. The terminal 1800 may be a mobile phone, a tablet computer, a multimedia player, a wearable device, or the like.

Generally, the terminal 1800 includes a processor 1801 and a memory 1802.

The processor 1801 may include one or more processing cores, and may be, for example, a 4-core processor or an 8-core processor. The processor 1801 may be implemented by using at least one hardware form of a digital signal processor (DSP), a field programmable gate array (FPGA), and a programmable logic array (PLA). The processor 1801 may alternatively include a main processor and a coprocessor. The main processor is a processor configured to process data in an awake state, also referred to as a central processing unit (CPU), and the coprocessor is a low-power processor configured to process data in a standby state. In some embodiments, the processor 1801 may be integrated with a graphics processing unit (GPU). The GPU is responsible for rendering and drawing content that a display screen needs to display. In some embodiments, the processor 1801 may further include an artificial intelligence (AI) processor. The AI processor is configured to process a computing operation related to machine learning.

The memory 1802 may include one or more computer-readable storage medium. The computer-readable storage medium may be non-transient. The memory 1802 may further include a high-speed random access memory and a non-volatile memory, for example, one or more disk storage devices or flash memory devices. In some embodiments, a non-transitory computer-readable storage medium in the memory 1802 is configured to store at least one instruction, at least one program, a code set, or an instruction set, the at least one instruction, the at least one program, the code set, or the instruction set being configured to be executed by the processor 1801 to implement the method provided in the method embodiments of this disclosure.

In some embodiments, the terminal 1800 may include a peripheral device interface 1803 and at least one peripheral device. The processor 1801, the memory 1802, and the peripheral device interface 1803 may be connected through a bus or a signal cable. Each peripheral device may be connected to the peripheral device interface 1803 through a bus, a signal cable, or a circuit board. Specifically, the peripheral device includes at least one of a radio frequency circuit 1804, a touchscreen 1805, a camera 1806, an audio circuit 1807, a positioning component 1808, and a power supply 1809.

A person skilled in the art may understand that the structure shown in FIG. 18 constitutes no limitation on the terminal 1800, and the terminal may include more or fewer components than those shown in the figure, or some components may be combined, or a different component deployment may be used.

In an exemplary embodiment, a terminal is further provided, including a processor and a memory, the memory storing at least one instruction, at least one program, a code set, or an instruction set. The at least one instruction, the at least one program, the code set, or the instruction set is configured to be executed by one or more processors to implement the foregoing interface display method.

In an exemplary embodiment, a computer-readable storage medium is further provided, the storage medium storing at least one instruction, at least one program, a code set, or an instruction set, and the at least one instruction, the at least one program, the code set, or the instruction set, when executed by a processor of a computer device, implementing the foregoing interface display method.

The computer-readable storage medium may be a ROM, a random access memory (RAM), a CD-ROM, a magnetic tape, a floppy disk, an optical data storage device, or the like.

In an exemplary embodiment, a computer program product is further provided, and when executed, the computer program product is used for implementing the foregoing interface display method.

"A plurality of" mentioned in the specification means two or more. "And/or" describes an association relationship between associated objects and represents that three relationships may exist. For example, A and/or B may represent the following three cases: Only A exists, both A and B exist, and only B exists. The character "/" generally indicates an "or" relationship between the associated objects.

The foregoing descriptions are merely exemplary embodiments of this disclosure, but are not intended to limit this disclosure. Any modification, equivalent replacement, or improvement made without departing from the spirit and principle of this disclosure shall fall within the protection scope of this disclosure.

What is claimed is:

1. An interface display method, applicable to a terminal, the method comprising:
  displaying a multi-task floating window in front of a user interface of the terminal, the multi-task floating window comprising a process icon indicating related information of a running process;
receiving a trigger signal corresponding to a multi-task floating window;
displaying a task floating window set in response to the trigger signal, the task floating window set comprising at least one single-task floating window, and one single-task floating window being corresponding to one task;
receiving a selection instruction corresponding to a first single-task floating window in the task floating window set;
displaying a user interface of a first task corresponding to the first single-task floating window;
displaying a process floating window set in response to the trigger signal, the process floating window set comprising at least one process floating window, and the one process floating window being corresponding to the running process;
receiving a close instruction corresponding to the at least one process floating window in the process floating window set; and
closing the running process corresponding to the at least one process floating window.

2. The method of claim 1, further comprising:
displaying a user interface of a new task;
obtaining a floating window creation instruction corresponding to the user interface of the new task;
adding a single-task floating window corresponding to the new task to the task floating window set according to the floating window creation instruction; and
updating a task icon in the multi-task floating window according to the floating window creation instruction, the task icon being for indicating related information of the new task.

3. The method of claim 2, wherein the updating the task icon in the multi-task floating window comprises:
switching a style of the task icon in the multi-task floating window from a first display style to a second display style, wherein the second display style comprises an additional element corresponding to the new task in comparison with the first display style.

4. The method of claim 2, further comprising:
displaying a floating window trigger region in front of the user interface of the new task in response to detecting a slide signal meeting a preset condition;
displaying prompt information in the floating window trigger region in response to a quantity of existing single-task floating windows reaching a preset threshold, the prompt information being for prompting that the quantity of the existing single-task floating windows has reached the preset threshold; and
generating, in response to a trigger position of the slide signal being moved from outside of the floating window trigger region to inside of the floating window trigger region, feedback information prompting a failure to create the single-task floating window corresponding to the new task.

5. The method of claim 4, wherein after the obtaining the floating window creation instruction corresponding to the user interface of the new task, the method further comprises:
displaying reminder information in response to the quantity of the existing single-task floating windows reaching a preset threshold, the reminder information indicating a maximum quantity of single-task floating windows allowed to be created.

6. The method of claim 1, wherein after the displaying the multi-task floating window, the method further comprises:
receiving a drag operation signal corresponding to the multi-task floating window; and
displaying the multi-task floating window at a screen edge position corresponding to a disappearing position of the drag operation signal in response to detecting that the drag operation signal disappears.

7. The method of claim 1, wherein after the displaying the multi-task floating window, the method further comprises:
recording, in response to canceling display of the multi-task floating window, a display position of the multi-task floating window; and
displaying the multi-task floating window at the display position in response to redisplaying the multi-task floating window.

8. The method of claim 1, wherein the multi-task floating window comprises a task icon for indicating related information of a task for which the single-task floating window has been created.

9. The method of claim 8, wherein the task icon comprises at least one elements, each of the at least one elements is corresponding to one task for which a single-task floating window has been created.

10. An interface display apparatus, comprising:
a memory store thereon computer-readable instructions; and a processor operable to read the computer-readable instructions, the processor when executing the computer-readable instructions is configured to:
display a multi-task floating window in front of a user interface of a terminal, the multi-task floating window comprising a process icon indicating related information of a running process;
receive a trigger signal corresponding to a multi-task floating window;
display a task floating window set in response to the trigger signal, the task floating window set comprising at least one single-task floating window, and one single-task floating window being corresponding to one task;
receive a selection instruction corresponding to a first single-task floating window in the task floating window set;
display a user interface of a first task corresponding to the first single-task floating window;
display a process floating window set in response to the trigger signal, the process floating window set comprising at least one process floating window, and the one process floating window being corresponding to the running process;
receive a close instruction corresponding to the at least one process floating window in the process floating window set; and
close running process corresponding to the at least one process floating window.

11. The apparatus of claim 10, the processor is further configured to:
display a user interface of a new task;
obtain a floating window creation instruction corresponding to the user interface of the new task;
add a single-task floating window corresponding to the new task to the task floating window set according to the floating window creation instruction; and
update a task icon in the multi-task floating window according to the floating window creation instruction, the task icon being for indicating related information of the new task.

12. The apparatus of claim 11, wherein the processor is configured to:

switch a style of the task icon in the multi-task floating window from a first display style to a second display style, wherein the second display style comprises an additional element corresponding to the new task in comparison with the first display style.

13. The apparatus of claim 11, wherein the processor is further configured to:
display a floating window trigger region in front of the user interface of the new task in response to detecting a slide signal meeting a preset condition;
display prompt information in the floating window trigger region in response to a quantity of existing single-task floating windows reaching a preset threshold, the prompt information being for prompting that the quantity of the existing single-task floating windows has reached the preset threshold; and
generate, in response to a trigger position of the slide signal being moved from outside of the floating window trigger region to inside of the floating window trigger region, feedback information prompting a failure to create the single-task floating window corresponding to the new task.

14. The apparatus of claim 10, wherein the multi-task floating window comprises a task icon for indicating related information of a task for which the single-task floating window has been created.

15. The apparatus of claim 14, wherein the task icon comprises at least one element, each of the at least one element is corresponding to one task for which a single-task floating window has been created.

16. A non-transitory computer-readable storage medium, having processor executable instructions stored thereon for causing a processor to:
display a multi-task floating window in front of a user interface of a terminal, the multi-task floating window comprising a process icon indicating related information of a running process;
receive a trigger signal corresponding to a multi-task floating window;
display a task floating window set in response to the trigger signal, the task floating window set comprising at least one single-task floating window, and one single-task floating window being corresponding to one task;
receive a selection instruction corresponding to a first single-task floating window in the task floating window set;
display a user interface of a first task corresponding to the first single-task floating window;
display a process floating window set in response to the trigger signal, the process floating window set comprising at least one process floating window, and the one process floating window being corresponding to the running process;
receive a close instruction corresponding to the at least one process floating window in the process floating window set; and
close the running process corresponding to the target process floating window.

* * * * *

UNITED STATES PATENT AND TRADEMARK OFFICE
CERTIFICATE OF CORRECTION

| | |
|---|---|
| PATENT NO. | : 11,816,305 B2 |
| APPLICATION NO. | : 17/462183 |
| DATED | : November 14, 2023 |
| INVENTOR(S) | : Jianqin Meng et al. |

It is certified that error appears in the above-identified patent and that said Letters Patent is hereby corrected as shown below:

In the Claims

Column 22, Line 25 In Claim 10, "a memory store thereon" should be replaced with "a memory stored thereon"

Signed and Sealed this
Twenty-third Day of January, 2024

Katherine Kelly Vidal
*Director of the United States Patent and Trademark Office*